US012682243B2

(12) United States Patent
Groh et al.

(10) Patent No.: US 12,682,243 B2
(45) Date of Patent: Jul. 14, 2026

(54) METHOD AND DEVICE FOR TRAINING A SENSOR MODEL FOR CHANGE-POINT DETECTION

(71) Applicant: Robert Bosch GmbH, Stuttgart (DE)

(72) Inventors: Konrad Groh, Stuttgart (DE);
Matthias Woehrle,
Bietigheim-Bissingen (DE)

(73) Assignee: Robert Bosch GmbH, Stuttgart (DE)

( * ) Notice: Subject to any disclaimer, the term of this patent is extended or adjusted under 35 U.S.C. 154(b) by 786 days.

(21) Appl. No.: 18/153,503

(22) Filed: Jan. 12, 2023

(65) Prior Publication Data

US 2023/0222345 A1 Jul. 13, 2023

(30) Foreign Application Priority Data

Jan. 13, 2022 (DE) ...................... 10 2022 200 286.5

(51) Int. Cl.
*G06N 3/084* (2023.01)
(52) U.S. Cl.
CPC .................................... *G06N 3/084* (2013.01)
(58) Field of Classification Search
CPC G06N 3/084; G06N 3/08; G06N 3/04; G06N 3/063
See application file for complete search history.

(56) References Cited

U.S. PATENT DOCUMENTS

2007/0203616 A1 8/2007 Borrmann et al.
2020/0003659 A1* 1/2020 Davies ................... G06N 3/084
2020/0371491 A1* 11/2020 Wong ...................... G06N 3/084
2021/0034994 A1* 2/2021 Stocker ................... G06N 5/04
2022/0065785 A1* 3/2022 Cao ......................... G06F 17/18

FOREIGN PATENT DOCUMENTS

DE 10 2007 060 049 A1 6/2009
DE 10 2018 212 669 A1 1/2020
DE 10 2019 209 690 A1 3/2020
DE 10 2019 209 644 A1 1/2021

* cited by examiner

*Primary Examiner* — Kamran Afshar
*Assistant Examiner* — Brian J Hales
(74) *Attorney, Agent, or Firm* — Maginot, Moore & Beck LLP

(57) ABSTRACT

A method trains a data-based sensor model for determining a change-point timing in at least one sensor signal of a cyclic technical process executed by a technical system. The method includes providing sensor signal time series of a sampled measured value and an associated change-point timing, and determining an evaluation signal time series by defining a regular evaluation time window over the sensor signal time series. The method further includes determining training datasets having the evaluation signal time series and the assigned change-point timing, and training the data-based sensor model with the training datasets. The change-point timing is provided as a classification vector. The classification vector encodes a time point within the evaluation time window by a position of an element of the classification vector and encodes a time point before and/or after the evaluation time window by a further position of a further element of the classification vector.

5 Claims, 2 Drawing Sheets

METHOD AND DEVICE FOR TRAINING A SENSOR MODEL FOR CHANGE-POINT DETECTION

This application claims priority under 35 U.S.C. § 119 to patent application no. DE 10 2022 200 286.5, filed on Jan. 13, 2022 in Germany, the disclosure of which is incorporated herein by reference in its entirety.

The disclosure relates to a method for providing a sensor model for detecting a change point in a sensor signal time series, and in particular to measures for detecting a faulty evaluation time window for such a sensor signal time series.

BACKGROUND

Sensors for detecting physical quantity are often continuously sampled. For example, a pressure, mass flow, acceleration, temperature, vibration, acceleration, or the like may be detected using a suitable sensor. At the output of the sensor or sensor system, a sensor signal time series is then usually available as an electrical or digitized signal at predetermined sampling times. This indicates a time course of a sensor signal.

For evaluation, such a sensor signal time series can be analyzed so that special features of a technical system can be detected based on the progression of the sensor signal. While the sensor signals may be evaluated in various ways, one application is to determine a time point of a significant change of a system state by detecting a change-point in the sensor signal time series. To this end, a sensor model is usually provided, which assigns information to a cut-out of the sensor signal time series indicating a change-point timing.

SUMMARY

According to the disclosure, there is provided a method for training a data-based sensor model for determining a change-point timing in a sensor signal, a method for determining a change-point timing in a sensor signal time series, and corresponding devices.

According to the first aspect, a method for training a data-based sensor model for determining a change-point timing in a sensor signal of a cyclic technical process is provided, with the steps of:

providing sensor signal time series of a sampled measured value, and an associated change-point timing;
  determining training datasets having an evaluation signal time series and the assigned change-point timing, wherein the evaluation signal time series is determined by defining a regular evaluation time window over the sensor signal time series, wherein the change-point timing is provided as a classification vector, wherein the classification vector encodes a time point within the evaluation time window by a position of an element of the classification vector and encodes a time point in a time period before the start and/or after the end of the evaluation time window by a further position of a further element of the classification vector; and
  training the data-based sensor model with the training datasets.

In another aspect, a method for determining a change-point timing in a sensor signal time series of a sampled sensor signal of a cyclic technical process is provided, with the steps of:

sampling a sensor signal to obtain a sensor signal time series;

determining an evaluation signal time series as a cut-out from the sensor signal time series according to a predetermined evaluation time window;
  determining an output vector using a data-based sensor model, in particular a data-based sensor model trained using the above method,
  determining an index value of the position of an element of the output vector having a value closest to a predetermined first value; and
  assigning the index value to a change-point timing within the evaluation time window or to an indication that the change-point timing is outside the evaluation time window.

As described above, the above method relates to a sensor model for evaluating a sensor signal time series of a conventional sensor continuously sampled. Such a sensor may be, for example, a pressure sensor, a mass flow sensor, an acceleration sensor, a vibration sensor, a radiation sensor, or the like. In order to monitor a change over time, such sensors are usually sampled continuously over time at a predetermined sampling frequency, and thus a sensor signal time series is provided in an analog or digitized manner.

Such a sensor signal time series may be evaluated in various ways. In order to monitor system states, it is often necessary to detect a time point at which a significant state change occurs in the technical system to be surveyed. Such a time point is called a change-point timing.

A group of data-based sensor models has proven particularly for evaluating a sensor signal time series to determine a change-point timing. To this end, the sensor signal time series are sampled, and a time section of the sensor signal is selected through an evaluation time window. The section of the sensor signal time series detected within the evaluation time window is supplied to the sensor model as an input signal vector. This is configured as a data-based classification model so that, depending on the input signal vector, an output vector is output, which is configured as a classification vector. This classification vector usually has a dimensionality having a number of elements, each of which is assigned to a certain time point within the evaluation time window of the sensor signal time series. The index value of the relevant element in the output vector thus corresponds to a certain predetermined time point within the evaluation time window.

By using the sensor model as a classification model, an input signal vector is classified and thereby, a change-point timing in the sensor signal time series within the evaluation signal window is determined correspondingly to a training of the sensor model. The value of the element of the classification vector, that is, usually the element having the highest value, then has an index value which determines the time point in the sensor signal time series corresponding to the change-point timing.

Training such a data-based sensor model is usually performed with predetermined training datasets in a manner known by itself. The training data sets assign a classification vector as a label to an input signal vector (evaluation signal time series), which can be obtained by scanning/sampling an input signal time series within a predetermined evaluation signal time window.

It may be provided that if the change-point timing is within the evaluation time window, the (argmax of) classification vector(s) (as the label) indicates a change-point timing by a first value of that element in the classification vector, to which a time point is assigned that corresponds to or comes closest to the change-point timing, or, if the change-point timing is outside the evaluation time window, by a first value of the further element, and wherein the remaining elements have a second value different from the first value.

The classification vector can therefore represent the change-point timing for training the sensor model, in which a first value of e.g., "1", which differs significantly from a second values of the other elements, e.g., "0", is assigned to the element of the classification vector, whose index value corresponds to or is closest to the change-point time.

When evaluating such a sensor model, depending on the input signal vector, for each element of the classification vector, a value is output that indicates a probability, with which the time point assigned to the element index of the classification vector corresponds to the change-point timing.

For example, such a data-based sensor model may be configured as a deep neural network and may be trained using a back-propagation based training method.

When using a conventional data-based sensor model, the number of inputs or the dimension of the input signal vector is limited, so that a continuous evaluation of the sensor signal time series is not provided. Instead, the evaluation time window is defined, which defines, in particular a cyclically repeating time section from the sensor signal time series and provides this as evaluation signal time series on the input side of the sensor model in the form of the input signal vector.

Particularly in the case of cyclic evaluation time windows, whose time location can vary with respect to repetitive patterns in the sensor signal time series, the case may occur that the actual change-point timing is outside the evaluation time window. This case occurs during a phase shift of the time location of the evaluation time window in relation to the cyclic repeat of the pattern of the sensor signal time series. In this case, there is a risk that the evaluation of the evaluation signal time series by the trained sensor model will result in a time point that does not correspond to the sought change-point timing. In that case, a random feature is classified in the evaluation signal time series, and an erroneous change-point timing is determined. Usually, such a case cannot be detected without further ado.

Therefore, according to the above methods, it is provided to extend the sensor model, that in the case of a system state change, whose event time point is outside the selected evaluation time window for determining the evaluation signal time series, nevertheless it is still indicated that the change-point timing is outside the selected evaluation time window, in particular before or after the selected evaluation time window. This is possible because, usually in the case of cyclic sensor signal time series, characteristic signal profiles are also present outside the regular evaluation time window in which the change-point timing is located.

According to the above method, it is initially provided to create the sensor model, that in addition to the classification vector, which indicates a time point through its element values and element index, in the evaluation signal time series a change-point timing were indicated, one or more further classes are supplemented, which are characterized by corresponding additional elements of the classification vector.

It may be provided that an element having an index value is assigned to an indication; that the change-point timing is timely located before the evaluation time window and/or an element having an index value is assigned to an indication; that the change-point timing is timely located after the evaluation time window.

Thus, for example, an element of the classification vector may correspond to an evaluation time window-too late element, and indicate that the sought change-point timing is before the evaluation time window and the last element of the classification vector corresponds to an evaluation time window-too early element, and indicate that the change-point timing is after the set evaluation time window. In a systematic arrangement of the elements of the classification vector corresponding to the chronological order of the change-point timing to be classified, the first element of the classification vector may correspond to the evaluation time window-too late element, and the last element of the classification vector may correspond to an evaluation time window-too early element. Instead of the evaluation time window-too late element and the evaluation time window-too early element, a single out-of-range element can also be provided, which only indicates that the change-point timing to be classified is outside the evaluation time window.

As described above, for training the sensor model, training datasets can be used, which assign evaluation signal time series to a classification vector as a label, which provides a first value to the index position that corresponds to or is closest to the change-point timing to be trained, and for the remaining elements having the remaining index values, provide a second value different from the first value.

By shifting the timing of the evaluation time window before the change-point timing and setting the out-of-range element or the evaluation time window-too early element to a first value, and the values of the remaining elements to a second value as a label, corresponding training data can be generated. Furthermore, by shifting the timing of the evaluation time window behind the change-point timing and setting the out-of-range element or the evaluation time window-too late element to a first value and the values of the other elements to a second value as labels, more training data can be generated. In this way, a model output is obtained as a classification vector, which indicates a time for the change point as an index value within a correctly placed evaluation window and can otherwise indicate whether the change point time is outside or before or after the set evaluation window.

For evaluation, the sensor signal time series is detected, and corresponding to an externally predetermined evaluation time window, an evaluation signal time series is extracted or determined from the sensor signal time series. This is provided on the input side of the previously trained data-based sensor model in the form of an input signal vector in order to obtain a classification vector.

The classification vector may be normalized correspondingly to a Softmax function, and the element index having the maximum or minimum element value (or element value closest to the first value) may be determined. The determined element index is then assigned to a corresponding change-point timing in the evaluation signal time series corresponding to a time assignment between the index value and the relative time location with respect to the evaluation time window used when training the sensor model.

It can further be provided that, when determining an indication that the change-point timing is outside the evaluation time window, the timing of the evaluation time window will be shifted relative to the sensor signal time series.

According to a further aspect, a device for carrying out one of the above methods is provided.

BRIEF DESCRIPTION OF THE DRAWINGS

Embodiments are explained in more detail in the following with reference to the accompanying drawings. Here.

DETAILED DESCRIPTION

Figure 1:
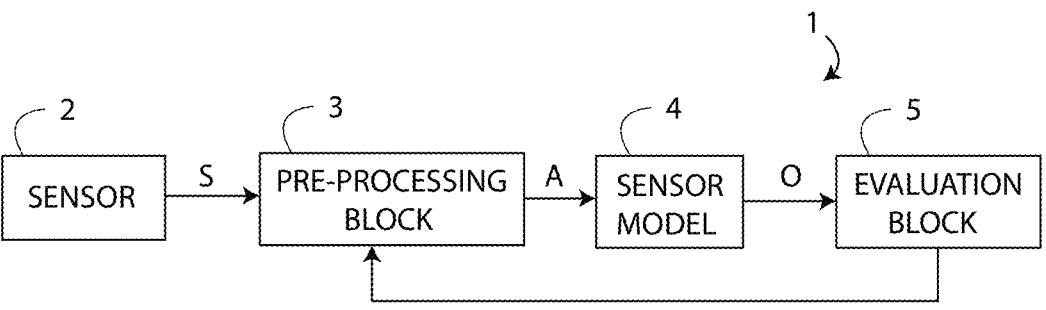
FIG. 1 shows a sensor system for determining a change-point timing in an evaluation time window.

FIG. 1 shows a sensor system 1 having a sensor 2 that is configured to record and detect continuous measurement signals. For example, sensor 2 may correspond to a pressure sensor, a mass flow sensor, a temperature sensor, an acceleration sensor, a vibration sensor, a radiation sensor, or the like, and is sampled at a sampling rate in order to obtain a sensor signal time series S.

The sensor signal time series corresponds to the detection of a varying physical quantity that changes correspondingly to a cyclic process. The cyclic process is detected and includes a cyclic state change that is translated into a change of physical quantity.

The sensor signal time series S is supplied to a pre-processing block 3, which cyclically applies an evaluation time window to the sensor signal time series S in order to determine an evaluation signal time series A. The evaluation signal time series has a predetermined number of sample values generated from the sensor signal time series S. The pre-processing block 3, depending on a specification of the evaluation time window, creates the evaluation signal time series A as a vector of predetermined length.

The evaluation time window is timed with respect to the sensor signal such that it comprises as far as possible the repeating state change of the change-point timing.

The evaluation signal time series A is supplied to a data-based trained sensor model 4 that may be configured, in particular in the form of a trained neural network, as an input signal vector in order to determine a change-point timing. The sensor model 4 outputs an output vector O corresponding to a classification output. The output vector O has elements whose index value is set to a time point or time period within the evaluation time window and is permanently assigned to it. Further, the output vector O has at least one element that is configured as an out-of-range element and/or an evaluation time window-too-early element and/or an evaluation time window-too-late element. These elements are determined by the index values permanently assigned to them, i.e., their position in the output vector. The out-of-range element indicates that the change-point timing is not within the evaluation time window; the evaluation time window-too-early element indicates that the evaluation time window is before the change-point timing and the evaluation time window-too-late element indicates that the evaluation time window is after the change-point timing.

If a shift or mismatch occurs between the location of the evaluation time window and the sensor signal, the evaluation time window may locate over the cyclic sensor signal time series that the change-point timing is outside the evaluation signal time series determined by the evaluation time window.

The sensor model 4 corresponds to a data-based classification model and outputs a classification vector, the elements of which are each assigned to a time point within the evaluation time window of time point. The index value (argmax) of the element determines the assigned time point. Moreover, the sensor model 4 is trained such that the classification vector has one or more further elements at predetermined index positions of the output vector or the classification vector. The further elements may correspond to the evaluation time window-too early element, the evaluation time window-too late element, or the out-of-range element.

These further elements are set, i.e., a maximum of the element values is detected if detected by the sensor model 4 that the evaluation time window and the resulting evaluation signal time series are before the change-point timing or timely after the change-point timing or usually outside the evaluation time window.

For evaluation, the output vector O is supplied to an evaluation block 5 which on the one hand performs the evaluation of the element values assigned to a time point and the detection of an evaluation time window-too-early event, an evaluation time window-too-late event, or an out-of-range event.

To this end, the element values are normalized, e.g., with a Softmax function, and the index value of the element having the value is determined, which is closest to a predetermined first value, e.g., "1". The first value is provided by the training method for the data-based sensor model 4 described below. A certain index value is assigned to a change-point timing, e.g., using a predetermined assignment table outputted accordingly.

If the index value points out to one of the other elements, this can be signaled to pre-processing block 3 by signaling an offset signal. Pre-processing block 3 determines the location of the evaluation time window depending on any offset signal received. In particular, the relative time location of the evaluation time window to the cyclic sensor signal time series may be determined depending on the presence of the offset signal.

If, for example, an evaluation time window-too early event is detected, the time location of the evaluation time window can be shifted (delayed), e.g., if an evaluation time window-too-late event is detected, the time location of the evaluation time window can be shifted forward.

In this way, by the feedback of the evaluation block 5 back to the pre-processing block, the time location of the evaluation time window can be adjusted so that the change-point timing can again be detected within the evaluation time window in subsequent cycles.

Figure 2:
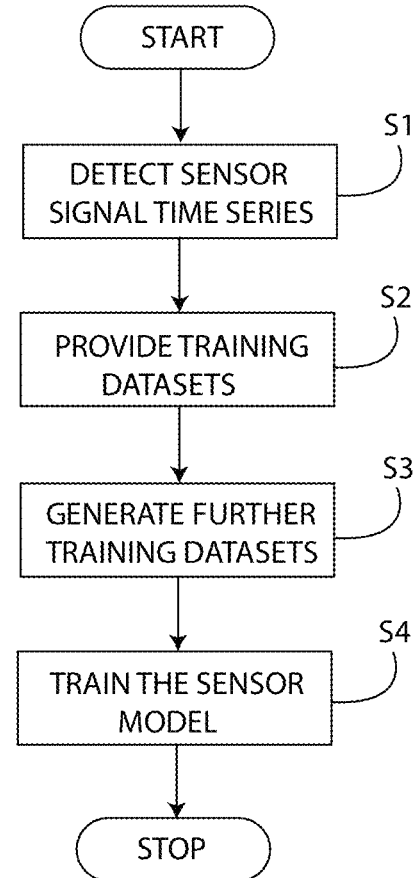
FIG. 2 shows a schematic representation for training a sensor model.

FIG. 2 shows a flow chart illustrating a method for training a corresponding sensor model 4.

In step S1, sensor signal time series of a sensor 2 are first detected and a change-point timing assigned to each of these by empirical measurements.

To this end, in step S2, training datasets having evaluation signal time series are provided, each of which is provided with a classification vector as a label. The classification vector corresponds to a vector having a number of elements, each of which is assigned to a particular time point. The time point of a change-point in the respective evaluation signal time series is encoded in the classification vector correspondingly so that the element having the index value assigned to the change-point timing is assigned to a first value, e.g., "1", and the remaining elements of the classification vector are each assigned to a second value, e.g., "0". The index value of the element occupied by the first value results from a predetermined assignment function which assigns the index value to a time point or a time section characterized by the time point.

In step S3, further training datasets are generated from existing sensor signal time series and corresponding known change-point timings. By varying the location of the evaluation time window such that the change-point timing is outside, an evaluation signal time series may be generated, which is now assigned to an index value of an evaluation time window-too-early element (if the change-point timing is chronologically after the evaluation window), an index value of an evaluation time window-too-late element (if the change-point timing is before the evaluation time window) or an index value of an out-of-range element (if the change-point timing is outside the evaluation time window) as a label.

The thus generated training datasets can now be used in step S4 for robustly training the sensor model 4. Training is performed in a manner known for data-based models by utilizing back-propagation techniques.

The method may basically be applied in various ways so that sensor signal time series are sampled cyclically using an evaluation time window in order to determine a cyclically repeating change-point timing.

Figure 3:
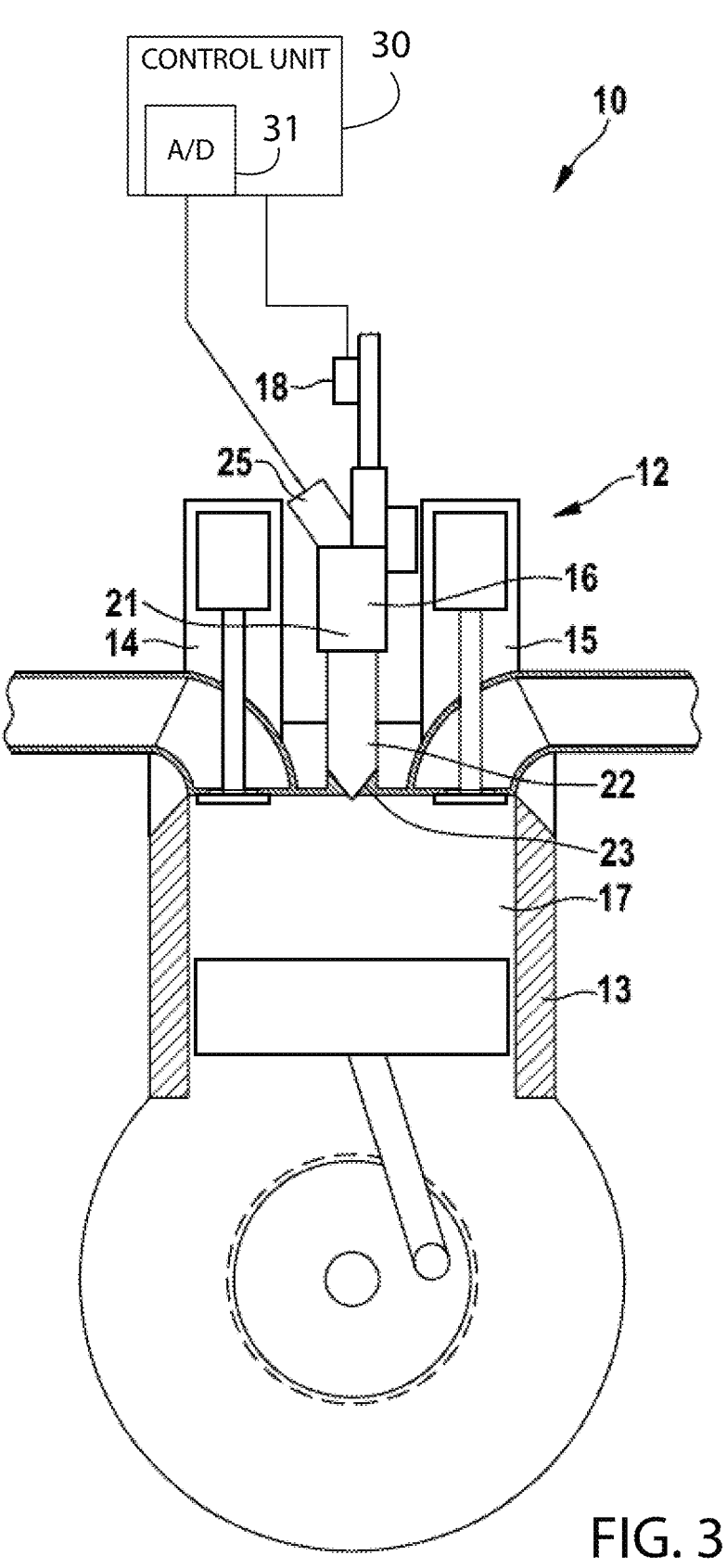
FIG. 3 shows a schematic representation of an injection system for injecting fuel into the cylinder of an internal combustion engine.

As an example of a sensor system 1, FIG. 3 shows an example of an injection system 10 for an internal combustion engine 12 of a motor vehicle, for which a cylinder 13 (of in particular a plurality of cylinders) is shown as an example. The internal combustion engine 12 is preferably configured as a direct-injection diesel engine but may also be provided as a gasoline engine.

The cylinder 13 has an intake valve 14 and an exhaust valve 15 for supplying fresh air and for exhausting combustion exhaust gas.

Furthermore, fuel for operating the internal combustion engine 12 is injected into a combustion chamber 17 of the cylinder 13 via an injection valve 16. To this end, fuel is supplied to the injection valve via a fuel supply 18, via which fuel is provided in a manner known per se (e.g., common rail) under a high fuel pressure.

The injection valve 16 has an electromagnetically or piezoelectrically controllable actuator unit 21 coupled to a valve needle 22. In the closed state of the injection valve 16, the valve needle 22 is seated on a needle seat 23. By controlling the actuator unit 21, the valve needle 22 is moved longitudinally and releases a portion of a valve opening in the needle seat 23 in order to inject the pressurized fuel into the combustion chamber 17 of the cylinder 13.

The injection valve 16 further has a piezo sensor 25 arranged in the injection valve 16. The piezo sensor 25 is deformed by pressure changes in the fuel supplied through the injection valve 16 and is generated by a voltage signal as a sensor signal.

The injection takes place in a manner controlled by a control unit 30 which specifies an amount of fuel to be injected by energizing the actuator unit 21. The sensor signal is sampled over time using an A/D converter 31 in the control unit 30, in particular at a sampling rate of 0.5 to 5 MHz.

Furthermore, a pressure sensor 18 is provided to determine a fuel pressure upstream of the injection valve 16.

During operation of the internal combustion engine 12, the sensor signal is used to determine a correct opening- or closing time point of the injection valve 16. To this end, the sensor signal is digitized into an evaluation point time series using the A/D converter 31 and evaluated by a suitable sensor model, from which an opening duration of the injection valve 16 and correspondingly an injected fuel amount can be determined as a function of the fuel pressure and other operating variables. In particular, in order to determine the opening duration, an opening time point and a closing time point are needed in order to determine the opening duration as the time difference of these parameters.

An opening time point and/or a closing time point may be determined by considering the sensor signal time series of the sampled sensor signal. In particular, the opening time point or the closing time point may be carried out using a data-based time point determining model.

In conjunction with the above sensor system 1, the sampled pressure signal corresponds to the sensor signal time series, wherein the actuation time for opening or closing the injection valve can be assumed as the change-point timing for the label. The evaluation time window results from the cyclic repetition of the injection event in an internal combustion engine with a time location which begins substantially a predetermined duration of time before the actuated opening time point.

Further applications may arise for data-based sensor models evaluating one or more sensor time series signals in order to detect a state of a technical system. For example, the state may indicate a measure of coking of an intake tract of an internal combustion engine. Furthermore, the use of a defeat device in the sense of an anomaly detection and for monitoring proper functioning, such as a drilling error detection due to a change in a torque of a drill and the like, may also be comprised.

What is claimed is:

1. A method for training a data-based sensor model for determining a change-point timing in at least one sensor signal of a cyclic technical process executed by a technical system, the method comprising:

providing a sensor signal time series of a sampled measured value and a change-point timing;

determining an evaluation signal time series by defining an evaluation time window over the sensor signal time series;

determining training datasets having the evaluation signal time series and the change-point timing; and training the data-based sensor model with the determined training datasets for determining the change-point timing in the at least one sensor signal of the cyclic technical process executed by the technical system, wherein the change-point timing is provided as a classification vector including a plurality of elements, each element of the plurality of elements assigned to a time point of a plurality of time points within the evaluation time window, wherein when the change-point timing occurs within the evaluation time window, the classification vector encodes the change-point timing as a value of a corresponding element of the classification vector that corresponds to or comes closest to the time point of the change-point timing, wherein when the change-point timing occurs before the evaluation time window, the classification vector encodes the change-point timing as a value of a first predetermined element of the classification vector, wherein when the change-point timing occurs after the evaluation time window, the classification vector encodes the change-point timing as a value of a second predetermined element of the classification vector, and wherein the data-based sensor model is configured as a deep neural network and is trained using a back-propagation-based training method.

2. The method according to claim 1, wherein:

the change-point timing is encoded as the value of the corresponding element of the classification vector, and remaining elements of the classification vector are encoded with a value different from the value of the corresponding element of the classification vector.

3. A method for determining a change-point timing in a sensor signal time series of a sampled sensor signal of a cyclic technical process executed by a technical system, comprising:

sampling a sensor signal to obtain a sensor signal time series;

determining an evaluation signal time series as a cut-out of the sensor signal time series according to a predetermined evaluation time window, the evaluation signal time series including a plurality of sensor values each having a corresponding time point of a plurality of time points;

determining an output vector using a data-based sensor model, the output vector including a plurality of elements each having a corresponding index value of a plurality of index values and a corresponding numerical value, each index value corresponding to a time point of the plurality of time points;

searching the output vector to identify a change-point index value of the plurality of index values, the change-point index value having a numerical value closest to a predetermined value; and assigning the change-point index value to the change-point timing to indicate when (i) the change-point timing is within the predetermined evaluation time window, or (ii) the change-point timing is outside the predetermined evaluation time window, wherein the technical system is an internal combustion engine having a fuel injection valve, and an actuation time for opening and closing the fuel injection valve is the change-point timing, and wherein the opening and the closing of the fuel injection valve is controlled based on the assigned change-point index value, which indicates the change-point timing relative to the evaluation time window.

4. The method according to claim 3, wherein:

a first element has an index value assigned to an indication that the change-point timing is located before the predetermined evaluation time window, and a second element has an index value assigned to an indication that the change-point timing is located after the predetermined evaluation time window.

5. The method according to claim 3, wherein, after determining that the change-point timing is outside the predetermined evaluation time window, shifting the predetermined evaluation time window relative to the sensor signal time series.

\* \* \* \* \*